United States Patent [19]
Prucha et al.

[11] Patent Number: 5,992,034
[45] Date of Patent: Nov. 30, 1999

[54] ATTACHMENT FOR THE ENHANCED MEASUREMENT ACCURACY OF A COMBINATION SQUARE

[76] Inventors: Mark Prucha, 1305 Third St.; Tom Zieloski, 715 2nd St., both of Kewaunee, Wis. 54216

[21] Appl. No.: 09/006,423

[22] Filed: Jan. 13, 1998

[51] Int. Cl.⁶ .................................................. G01B 3/00
[52] U.S. Cl. ................................. 33/474; 33/484
[58] Field of Search ........................... 33/480, 474, 484, 33/489, 471, 479, 42

[56] References Cited

U.S. PATENT DOCUMENTS

| | | | |
|---|---|---|---|
| 484,575 | 10/1892 | Wetterhann | 33/480 |
| 2,504,251 | 4/1950 | Coffey | 33/484 |
| 2,571,569 | 10/1951 | Greenwood | 33/484 |
| 4,349,966 | 9/1982 | Marino et al. | 33/489 |
| 4,403,423 | 9/1983 | Ford et al. | 33/474 |
| 4,773,163 | 9/1988 | Wolford | 33/74 |
| 5,396,710 | 3/1995 | Battaglia | 33/474 |
| 5,456,015 | 10/1995 | Butcher et al. | 33/474 |

FOREIGN PATENT DOCUMENTS

| | | | |
|---|---|---|---|
| 35748 | 1/1965 | Germany | 33/484 |
| 923150 | 6/1960 | United Kingdom | 33/430 |

*Primary Examiner*—Christopher W. Fulton
*Assistant Examiner*—Maria Fernandez
*Attorney, Agent, or Firm*—John D. Gugliotta

[57] ABSTRACT

An attachment for the enhanced measurement accuracy of a combination square is provided which consists of a horizontally elongated base of generally rectangular shape. A rectangular base indentation is positioned along the horizontal centerline of the base, and forms a plane that is parallel to the bottom surface of the base. The base indentation lateral walls are equidistant from the horizontal centerline of the base, and are of sufficient lateral distance to allow the handle lower contact surface of a combination square to have sufficient lateral clearance to slidably engage the base indentation and rest against the base indentation contact surface. The vertical depth of the base indentation provides sufficient vertical clearance for the handle upper contact surface to fit within the assembled device. A combination square blade receiving slot runs along the horizontal centerline of the base, and has a lateral width, vertical height, and horizontal depth sufficient to permit the combination square blade to slide into and become seated within it. Removably positioned against the base upper surface are two impingement plates, secured to the base by removable impingement plate securement means. When the impingement plates are secured to the base, a bounded area is created, partially bounded on the top by the impingement plate bottom surface, bounded completely on the sides by the base indentation lateral walls, and bounded on the bottom by the base indentation contact surface. An interference notch on each impingement plate stops the forward movement of the combination square into the present invention.

11 Claims, 5 Drawing Sheets

ATTACHMENT FOR THE ENHANCED MEASUREMENT ACCURACY OF A COMBINATION SQUARE

BACKGROUND OF THE INVENTION

1. Field of the Invention

The present invention relates generally to hand-held measurement devices and, more particularly, to an attachment for the enhanced measurement accuracy of a combination square.

2. Description of the Related Art

As is well known, the combination square performs numerous functions. The graduated numbering on the blade allows the combination square to be used as a normal ruler. When placed on its side, with the blade lying flat against a working surface, such as a table, the combination square is used to square a working surface in the horizontal plane.

When the combination square is placed in the vertical position, with the blade extending out from the handle in the vertical plane, the combination square helps to square an object in the vertical plane.

In order to utilize the ruler portion of the blade and obtain accurate measurements, it is critical that the working surface be squared properly. However, utilizing the combination square to square a working surface is problematic in certain situations.

The first situation problematic for the use of combination squares is squaring an object in the vertical plane. The lower surface of the combination square handle, which horizontally engages and rests upon the working surface being squared, has a small cross sectional area. This small cross sectional area facilitates the rotation of the combination square along the horizontal axis of the handle. This results in inaccurate vertical readings of the object being measured.

Second, this rotational problem is magnified when the working surface being measured has no flat surface in the vertical or horizontal planes to engage the lower surface of the combination square handle. This occurs most often when measuring rounded corners.

Another problem created from the small surface area of the lower surface of the combination square handle involves the use of levels. Several combination squares utilize a bubble level positioned within the handle of the combination square, in a plane parallel to the lower surface of the handle and perpendicular to the edge of the blade. The limited surface area of the lower surface of the handle precipitates rotational distortion of the handle, as discussed above. As a result of this distortion, a stable, accurate, level measurement is made more difficult to obtain.

Examples of devices in the previous art that incorporate plumb levels are U.S. Pat. No. 5,459,935, issued in the name of Paulson et. al., U.S. Pat. No. 5,452,522, issued in the name of Kook et. al., and U.S. Pat. No. 4,503,624, issued in the name of Whiteford.

These devices, however, do not address the rotational problems addressed by the present invention. Furthermore, only the '624 device discloses a combination square. In addition, the '935, '522, and '624 devices disclose squares with additional technology designed to increase measurement accuracy. As such, none of these devices address the need for an attachment that will increase the accuracy of existing, traditional combination squares. Also, the devices do not address the torsional distortion problem discussed above.

Other devices in the previous art disclose various attachments for combination square. These devices, however, are designed to address different needs than that of the present invention. For example, U.S. Pat. No. 5,276,973, issued in the name of Rakauskas, discloses a combination square height/width gage. The device consists of a head portion slidably engaged to the blade of the combination square. It was specifically designed to set the height of a tale saw, to set the position of a rip fence, to set the drill depth on a drill press, etc. It does not address the rotational problems discussed above.

U.S. Pat. No. 3,533,165, issued in the name of Larsen, discloses a vernier attachment for a combination square. However, this device is only designed to assist in the measurement of distances parallel to the blade of the combination square. As such, it does not address the rotational problems of squaring a surface area discussed above.

A search of the prior art did not disclose any patents that read directly on the claims of the instant invention.

Consequently, a need has been felt for providing an apparatus which overcomes the problems cited above.

SUMMARY OF THE INVENTION

It is therefore an object of the present invention to provide an improved attachment for the enhanced measurement accuracy of a combination square.

In accordance with a preferred embodiment, the present invention is composed generally of a base, including four base receiving orifices, a base indentation, and combination square blade receiving slot. The present invention also generally discloses two impingement plates, each with two impingement plate receiving orifices, an interference notch and impingement plate securement means.

The base is horizontally elongated and of generally rectangular shape. Located on the base upper surface and extending in a vertical plane through the m base to the base bottom surface are four base receiving orifices. Penetrating the base upper surface, along the horizontal center line of the base, and extending vertically downward and laterally outward, is a base indentation. A base indentation contact surface is the surface created by the formation of the base indentation. The lateral width of the base indentation is such that the horizontal centerline of the base indentation and base indentation contact surface overlap the horizontal centerline of the base. The base indentation contact surface forms a horizontal plane that is parallel to the plane formed from the base bottom surface.

The base indentation lateral walls are equidistant from the horizontal centerline of the base, and are of sufficient lateral distance to allow the handle lower contact surface of a combination square to have sufficient lateral clearance to slidably engage the base indentation and rest against the base indentation contact surface. The vertical depth of the base indentation provides sufficient vertical clearance for the handle upper contact surface to fit within the assembled device.

Starting from the base anterior surface and extending in the vertical plane through the base, along the horizontal centerline of the base, is the combination square blade receiving slot. The lateral width and horizontal depth of the combination square blade receiving slot is sufficient to permit the combination square blade to slide into and become seated within the combination square blade receiving slot. The side walls of the combination square blade receiving slot are perpendicular to the plane formed by the base bottom surface.

Removably positioned against the base upper surface are two impingement plates. Each impingement plate is horizontally elongated and is the same horizontal length as the base. Each impingement plate lateral exterior surface is in vertical planar alignment with the corresponding base lateral exterior surface. Each impingement plate extends laterally inward toward the horizontal centerline of the base and terminates beyond and overlaps the vertical plane formed by the corresponding base indentation lateral wall.

Located on each impingement plate are two impingement plate receiving orifices, whose center lines are in vertical linear alignment with the corresponding base receiving orifice. Each impingement plate is secured to the base by a impingement plate securement means, such as thumb screws or hex head screws.

When the impingement plates are secured to the base, a bounded area is created, partially bounded on the top by the impingement plate bottom surface, bounded completely on the sides by the base indentation lateral walls, and bounded on the bottom by the base indentation contact surface.

Located on the interior, front corners of each impingement plate is an interference notch. Each interference notch is of lateral width such that each interference notch lateral wall is in vertical planar alignment with the corresponding base indentation lateral wall. The interference notch interior walls are in vertical planar alignment.

To use the present invention, the impingement plates are connected to the base, and the impingement plate securement means are loosened so as to allow sufficient clearance for the combination square handle. The combination square is positioned in front of the present invention so that the handle lower contact surface is facing downward and the combination square blade is at its farthest position from the base anterior surface.

The combination square handle is then inserted into the area bounded by the impingement plate bottom surface, the base indentation lateral walls, and the base indentation contact surface. The handle upper contact surface slidably engages the impingement plate bottom surface. The handle lower contact surface slidably engages the base indentation contact surface, and the handle side contact surfaces slidably engages the base indentation lateral walls.

As the combination square continues to be inserted into the present invention, the combination square blade will slide into the combination square blade receiving slot. When the handle rear contact surface engages the interference notch interior wall, further horizontal movement of the combination square handle relative to the present invention is prevented. The combination square blade back will be in vertical linear alignment with the base anterior surface, and thus not protruding from the present invention. The impingement plate securement means are now fastened to hold the combination square in position.

After using the present invention, the impingement plate securement means are loosed, and the combination square handle and combination square blade are slidably removed from the present invention.

It is a further object of the present invention to provide for an effective, increased cross sectional area, substitute for a combination square handle lower contact surface.

It is a further object of the present invention to enhance the ability of a combination square to square objects in the vertical plane by reducing rotational distortion along the horizontal axis of the handle.

It is a further object of the present invention to enhance the ability of a combination square to square objects in the horizontal plane by reducing rotational distortion along the vertical axis of the handle.

It is a further object of the present invention to enhance the ability of the user of a combination square to properly read attached bubble levels.

It is a further object of the present invention to enhance the accuracy of a combination square on rounded or routed surfaces.

It is a further object of the present invention to make routine measurements on a smooth surface with the combination square easier and more accurate.

It is another object of the present invention in its preferred embodiment to provide a device that attaches to most combination squares on the market.

It is envisioned that alternate embodiments of the present invention will disclose slight changes in the depth of the combination square receiving slot and/or the interference notch will make the present invention attachable to all combination squares on the market.

It is another object of the present invention in its preferred embodiment to provide a device that is corrosion resistant, being made from a corrosion resistant material, such as aluminum. This feature also eliminates the need for a finishing coat, thus reducing labor and production costs.

It is another object of the present invention to provide a device of small cost.

It is another object of the present invention to provide a device utilizing impingement plate securement means, such as thumb screws or hex head screws, that can be quickly attached and loosened from combination squares.

It is another object of the present invention to provide a device which mounts flush to the edge of the combination square blade, resulting in extremely precise measurements.

It is another object of the present invention to provide a compact device that is easy to manipulate and easy to store away in a tool box when not in use.

It is another object of the present invention to provide a lightweight device, thus further facilitating ease of attachment and detachment.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | attachment for the enhanced measurement accuracy of a combination square. |
| 15 | combination square |
| 20 | base |
| 30 | base upper surface |
| 40 | base bottom surface |
| 50 | base receiving orifice |
| 60 | base indentation |
| 70 | base indentation contact surface |
| 80 | base indentation lateral wall |
| 90 | handle lower contact |
| 100 | handle upper contact |
| 110 | base anterior surface |
| 120 | combination square blade receiving slot |
| 130 | combination square blade |
| 135 | sidewall |
| 140 | impingement plate |
| 150 | impingement plate lateral exterior surface |
| 160 | base lateral exterior surface |
| 170 | impingement plate receiving orifice |
| 180 | impingement plate securement means |
| 190 | impingement plate bottom surface |
| 200 | interference notch |
| 205 | interference notch lateral wall |
| 210 | interference notch interior wall |
| 220 | combination square handle |
| 230 | handle side contact surface |
| 240 | handle rear contact surface |
| 250 | combination square blade back |

DESCRIPTION OF THE PREFERRED EMBODIMENTS

In order to describe the complete relationship of the invention, it is essential that some description be given to the manner and practice of functional utility and description of an attachment for the enhanced measurement accuracy of a combination square.

The best mode for carrying out the invention is presented in terms of its preferred embodiment, herein depicted within the Figures.

1. Detailed Description of the Figures

Figure 1:
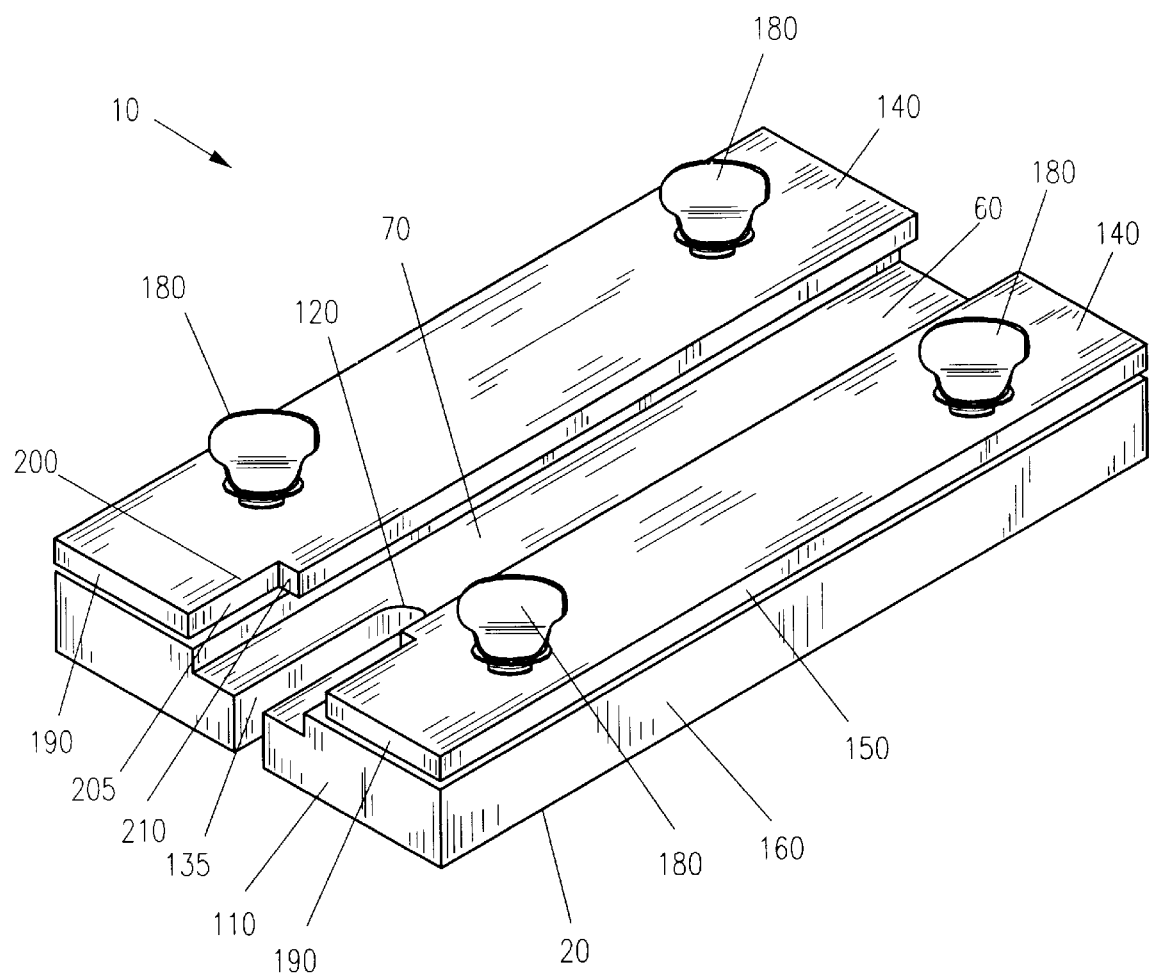
FIG. 1 is an elevated perspective view of the preferred embodiment of the present invention.
Figure 2:
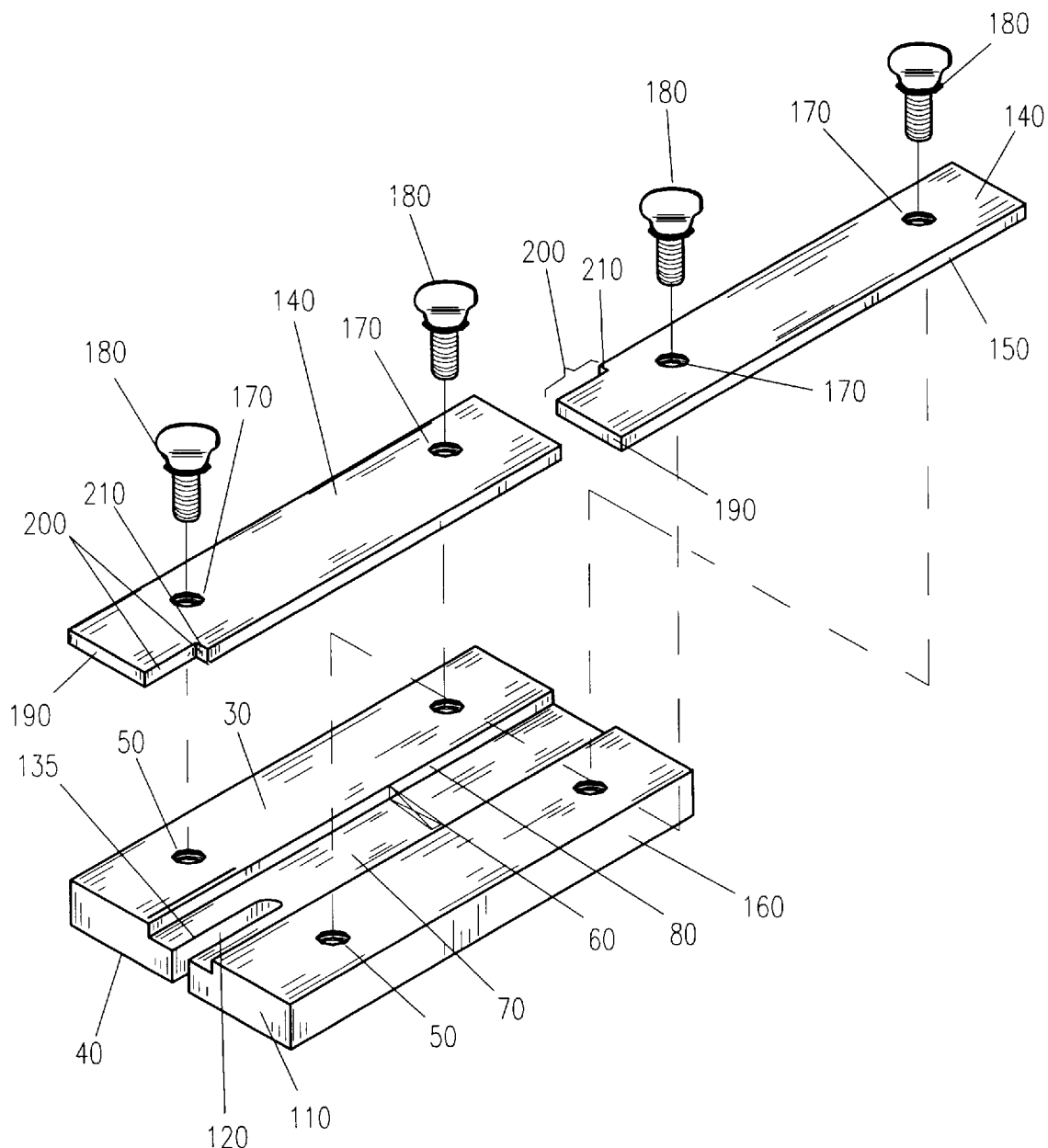
FIG. 2 is an exploded perspective view of an attachment for the enhanced measurement accuracy of a combination square.
Figure 3:
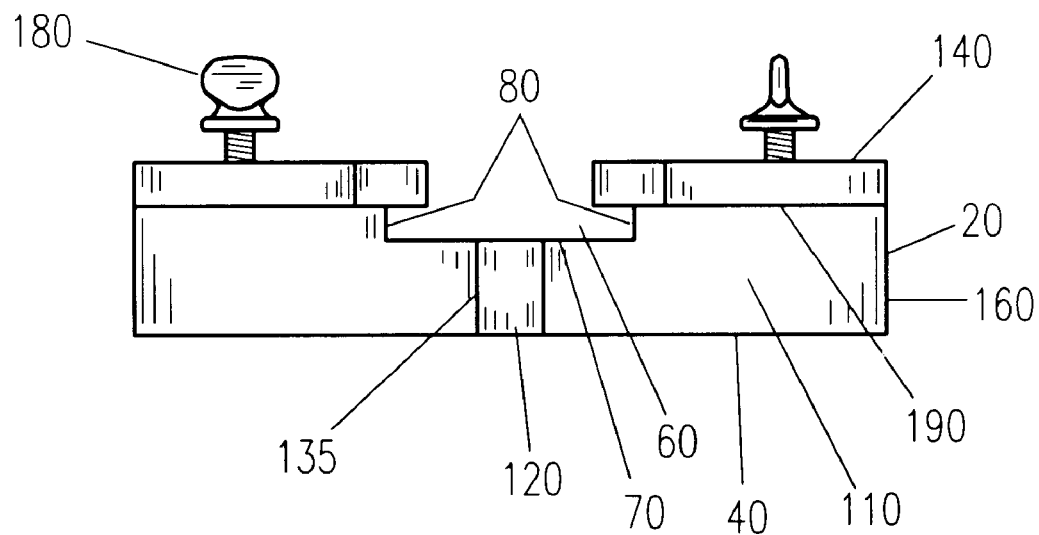
FIG. 3 is a front view.

Referring now to FIGS. 1 and 2, the preferred embodiment of an attachment for the enhanced measurement accuracy of a combination square 10 is shown, according to the present invention, used in conjunction with a combination square 15, and consisting of a base 20, which is horizontally elongated and of generally rectangular shape. Located on the base upper surface 30 and extending in a vertical plane through the base 20 to the base bottom surface 40 are four base receiving orifices 50.

Referring now to FIGS. 1 through 4, penetrating the base upper surface 30, along the horizontal center line of the base 20, and extending vertically downward and laterally outward is a base indentation 60. A base indentation contact surface 70 is the surface created by the formation of the base indentation 60. The lateral width of the base indentation 60 is such that the horizontal centerline of the base indentation 60 and base indentation contact surface 70 overlap the horizontal centerline of the base 20. The base indentation contact surface 70 forms a horizontal plane that is parallel to the plane formed from the base bottom surface 40.

Figure 6:
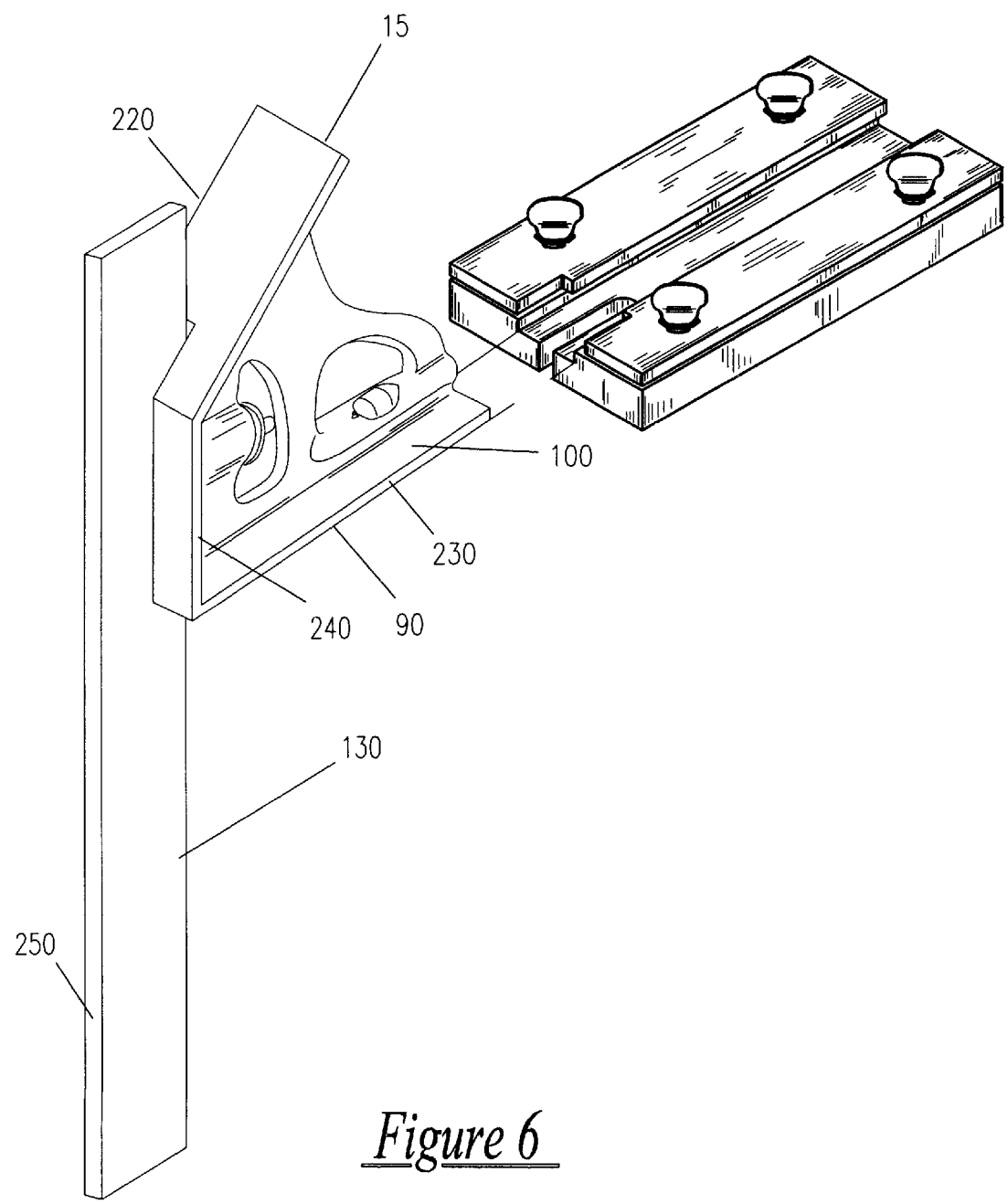
FIG. 6 is an exploded perspective view of the preferred embodiment of the present invention in use.

Referring now to FIGS. 1 and 6, the base indentation lateral walls 80 are equidistant from the horizontal centerline of the base 20, and are of sufficient lateral distance to allow the handle lower contact surface 90 of a combination square 15 to have sufficient lateral clearance to slidably engage the base indentation 60 and rest against the base indentation contact surface 70. The vertical depth of the base indentation 60 provides sufficient vertical clearance for the handle upper contact surface 100 to fit within the assembled device.

Starting from the base anterior surface 110 and extending in the vertical plane through the base 20, along the horizontal centerline of the base 20 is the combination square blade receiving slot 120. The lateral width and horizontal depth of the combination square blade receiving slot 120 is sufficient to permit the combination square blade 130 to slide into and become seated within the combination square blade receiving slot 120. The side walls 135 of the combination square blade receiving slot 120 are perpendicular to the plane formed by the base bottom surface 40.

Removably positioned against the base upper surface 30 are two impingement plates 140. Each impingement plate 140 is horizontally elongated and is the same horizontal length as the base 20. Each impingement plate lateral exterior surface 150 is in vertical planar alignment with the corresponding base lateral exterior surface 160. Each impingement plate 140 extends laterally inward toward the horizontal centerline of the base 20 and terminates beyond and overlaps the vertical plane formed by the corresponding base indentation lateral wall 80.

Located on each impingement plate 140 are two impingement plate receiving orifices 170, whose center lines are in vertical linear alignment with the corresponding base receiving orifice 50. Each impingement plate 140 is secured to the base by a impingement plate securement means 180, such as thumb screws or hex head screws.

Figure 4:
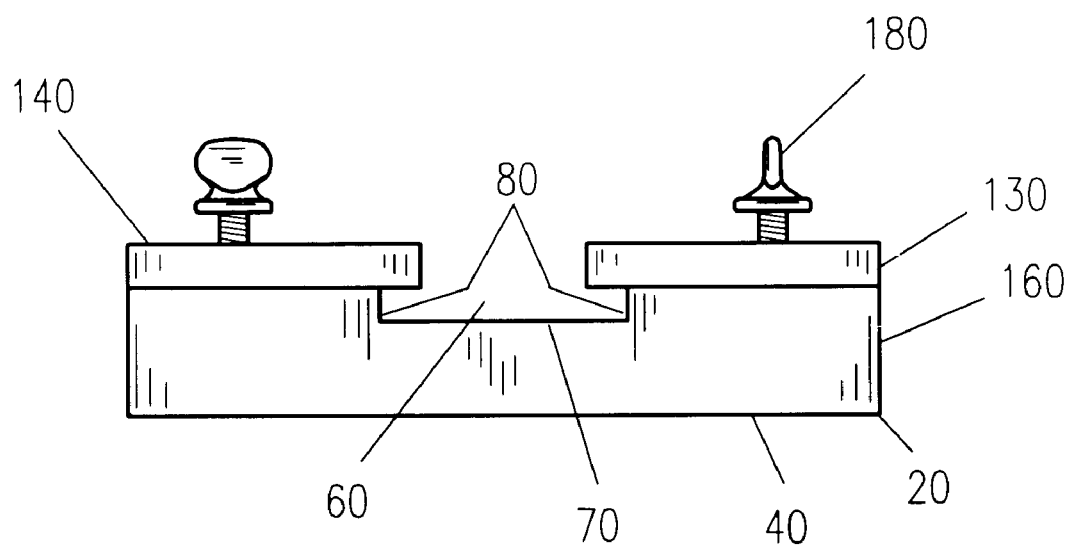
FIG. 4 is a rear view.

Referring now to FIGS. 1 and 4, when the impingement plates 140 are secured to the base 20, a bounded area is created, partially bounded on the top by the impingement plate bottom surface 190, bounded completely on the sides by the base indentation lateral walls 80, and bounded on the bottom by the base indentation contact surface 70.

Located on the interior, front corners of each impingement plate 140 is an interference notch 200. Each interference notch 200 is of lateral width such that each interference notch lateral wall 205 is in vertical planar alignment with the corresponding base indentation lateral wall 80. The interference notch interior walls 210 are in vertical planar alignment.

Figure 5A:
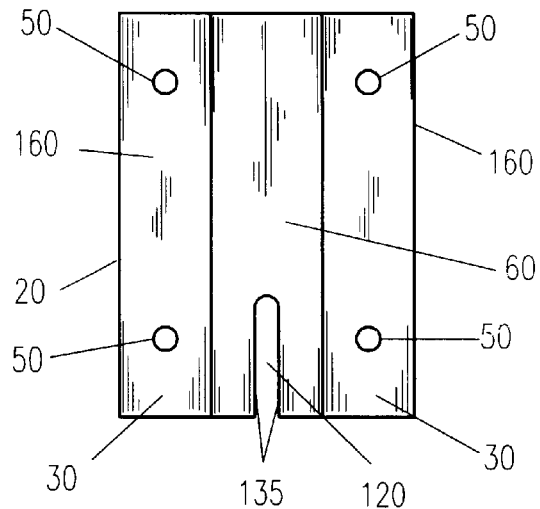
FIG. 5a is a top view of the base.
Figure 5B:
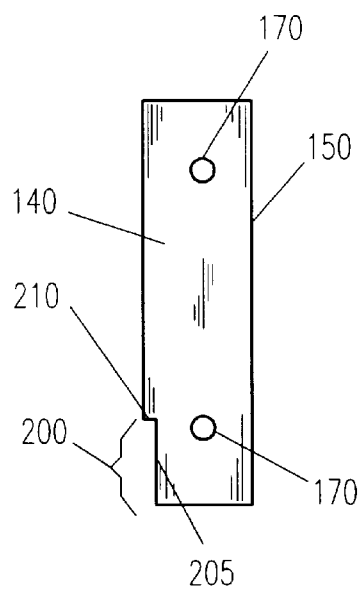
FIG. 5b is a top view of an impingement plate.
Figure 5C:
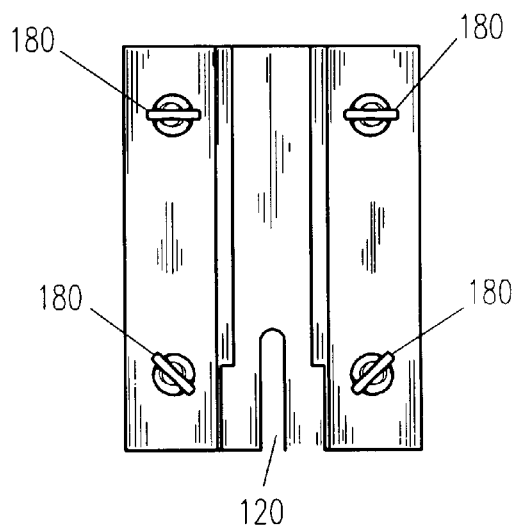
FIG. 5c is a top view of the assembled base and impingement plates.

FIGS. 5a, 5b and 5c illustrate the structural configuration of the base 20 and impingement plates 140 when separate and when attached.

2. Operation of the Preferred Embodiment

Referring now to FIG. 6, to use the present invention, the impingement plates 140 are connected to the base 20, and the impingement plate securement means 180 are loosened so as to allow sufficient clearance for the combination square handle 220. The combination square 15 is positioned in front of the present invention so that the handle lower contact surface 90 is facing downward and the combination square blade 130 is at its farthest position from the base anterior surface 110.

The combination square handle 220 is then inserted into the area bounded by the impingement plate bottom surface 190, the base indentation lateral walls 80, and the base indentation contact surface 70. The handle upper contact surface 100 slidably engages the impingement plate bottom surface 190. The handle lower contact surface 90 slidably engages the base indentation contact surface 70, and the handle side contact surfaces 230 slidably engage the base indentation lateral walls 80.

As the combination square 15 continues to be inserted into the present invention, the combination square blade 130 will slide into the combination square blade receiving slot 120. When the handle rear contact surface 240 engages the interference notch interior wall 210, further horizontal movement of the combination square handle 220 relative to the present invention is prevented. The combination square blade back 250 will be in vertical linear alignment with the base anterior surface 110, and thus not protruding from the present invention. The impingement plate securement means 180 are now fastened to hold the combination square 15 in position.

After using the present invention, the impingement plate securement means 180 are loosed, and the combination square handle 220 and combination square blade 130 are slidably removed from the present invention.

The foregoing description is included to illustrate the operation of the preferred embodiment and is not meant to limit the scope of the invention. The scope of the invention is to be limited only by the following claims.

What is claimed is:

1. An attachment for the enhanced measurement accuracy of a combination square comprising:
    a base, said base being horizontally elongated and of generally rectangular shape, with said base being further having a base upper surface, a base bottom surface and a base anterior surface;
    a base indentation formed by said base, said base indentation being of rectangular shape and indented downward from said base upper surface, said base indentation being the resting surface for a combination square which is inserted into the attachment device;
    four base receiving orifices, each said base receiving orifices being formed on said base upper surface and extending in a vertical plane through said base to said base bottom surface;
    a combination square blade receiving slot, said combination square blade receiving slot formed within said base starting from said base anterior surface and extending in the vertical plane through said base, along the horizontal centerline of said base;
    two impingement plates, each having a bottom surface, and each impingement plate removably positioned against said base upper surface, with each said impingement plate being horizontally elongated and of the same horizontal length as said base;
    four impingement plate receiving orifices, two said impingement plate receiving orifices located on each said impingement plate, and having center lines that are in vertical linear alignment with said corresponding base receiving orifice;
    four impingement plate securement means, two said impingement plate securement means used to secure each said impingement plate to said base;
    interference notches, said interference notch positioned on the front corner of each said impingement plate, said interference notches used to stop the forward movement of a combination square.

2. The attachment for the enhanced measurement accuracy of a combination square described in claim 1, wherein said base indentation penetrates said base upper surface along the horizontal centerline of said base, and extends vertically downward and laterally outward.

3. The attachment for the enhanced measurement accuracy of a combination square described in claim 1, wherein said base indentation further comprises;
    a base indentation contact surface, said base indentation contact surface being the surface created by the formation of said base indentation, with the lateral width of said base indentation such that the horizontal centerline of said base indentation and said base indentation contact surface overlap the horizontal centerline of said base;
    base indentation lateral walls, said base indentation lateral walls being equidistant from the horizontal centerline of said base, and of sufficient lateral distance to allow the handle lower contact surface of a combination square to have sufficient lateral clearance to slidably engage said base indentation and rest against said base indentation contact surface, with the vertical depth of said base indentation providing sufficient vertical clearance for a handle upper contact surface of a combination square to fit within said assembled attachment device.

4. The attachment for the enhanced measurement accuracy of a combination square described in claim 1, wherein said base indentation contact surface forms a horizontal plane that is parallel to the plane formed from said base bottom surface.

5. The attachment for the enhanced measurement accuracy of a combination square described in claim 1, wherein said combination square blade receiving slot is further comprised of side walls, said side walls being perpendicular to the plane formed by said base bottom surface.

6. The attachment for the enhanced measurement accuracy of a combination square described in claim 1, wherein said interference notch further comprises an interference notch interior wall, said interference notch interior wall of each said impingement plate being in the same vertical plane, and being the actual surface against which said combination square rests and is stopped thereby.

7. The attachment for the enhanced measurement accuracy of a combination square described in claim 1, wherein said component parts of said attachment device will be machined to accommodate combination squares of various sizes.

8. The attachment for the enhanced measurement accuracy of a combination square described in claim 1, wherein said combination square blade receiving slot is of lateral width, vertical height and horizontal depth sufficient to permit a combination square blade to slide into and become seated within said combination square blade receiving slot.

9. The attachment for the enhanced measurement accuracy of a combination square described in claim 1, wherein each said impingement plate extends laterally inward toward the horizontal centerline of said base and terminating beyond and overlapping above said base indentation.

10. The attachment for the enhanced measurement accuracy of a combination square described in claim 1, wherein when said impingement plates are secured to said base, a bounded area is created, said bounded area being partially bound on the top by said impingement plate bottom surface, bounded completely on the sides by said base indentation lateral walls, and bounded on the bottom by said base indentation contact surface.

11. The attachment for the enhanced measurement accuracy of a combination square described in claim 1, wherein when said components of said attachment device are made of metal.

* * * * *